(No Model.) 2 Sheets—Sheet 1.

W. D. SARGENT.
BRAKE SHOE.

No. 587,661. Patented Aug. 3, 1897.

Witnesses.

Inventor.
William D. Sargent
by Raymond & Cushman
Att'ys (No Model.) 2 Sheets—Sheet 2.
W. D. SARGENT.
BRAKE SHOE.
No. 587,661. Patented Aug. 3, 1897.
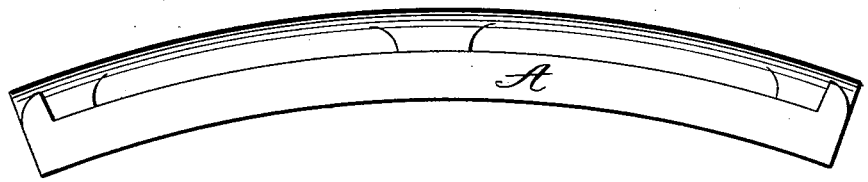
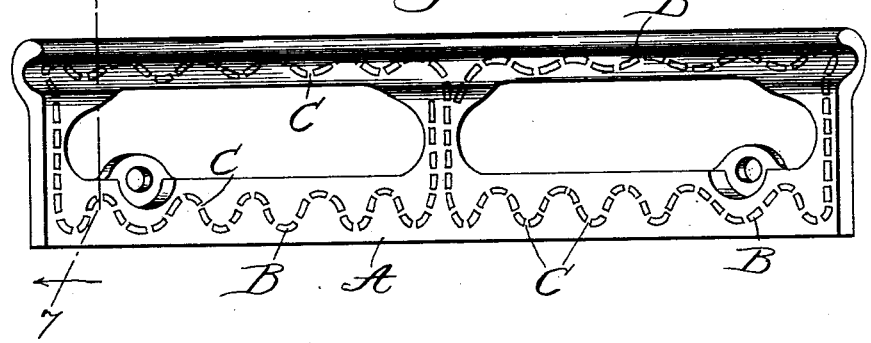
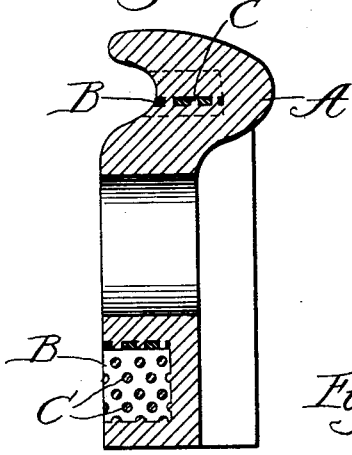
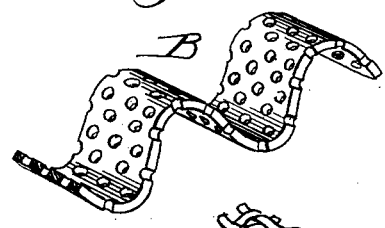
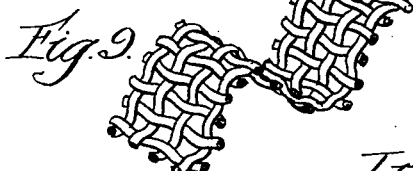
Witnesses
Inventor
William D. Sargent
by Raymond & Cushman
Attys

UNITED STATES PATENT OFFICE.

WILLIAM D. SARGENT, OF CHICAGO, ILLINOIS.

BRAKE-SHOE.

SPECIFICATION forming part of Letters Patent No. 587,661, dated August 3, 1897.

Application filed December 14, 1896. Serial No. 615,570. (No model.)

*To all whom it may concern:*

Be it known that I, WILLIAM D. SARGENT, a citizen of the United States, residing at Chicago, in the county of Cook and State of Illinois, have invented certain new and useful Improvements in Brake-Shoes, of which the following is a full, clear, and exact description, reference being had to the accompanying drawings, forming a part of this specification.

My present invention relates to certain new and useful improvements in brake-shoes, and it is applicable to brake-shoes of all descriptions whether designed to dress the wheel or not.

It is well known in the art that a cast-iron brake-shoe has the best braking qualities on account of its granular structure, but a shoe of this material wears out so rapidly that its use is not commercially practicable. A steel brake-shoe has the longest life, but its character is such that its braking qualities diminish with continued use by reason of the fact that its surface crystallizes and thereby decreases the friction between the shoe and the tread of the wheel.

It is my object therefore to provide a brake-shoe embodying the good qualities of a cast-iron shoe and a steel shoe—that is to say, a brake-shoe which has superior braking qualities and great longevity.

Another object of the invention is to provide a brake-shoe having a reinforcement distributed therein and serving not only to strengthen the shoe, but also to promote its longevity.

A further object of the invention is to provide a brake-shoe composed of two different kinds of metal united together and distributed in such a manner that the shoe will always present a wearing-face of a composite and practically uniform character.

With these and other ends in view my invention consists, broadly, of a brake-shoe having a foraminous sinuous reinforcement therein disposed and arranged, preferably, so that the wearing-face of the shoe will always comprise the two metals.

Figure 1:
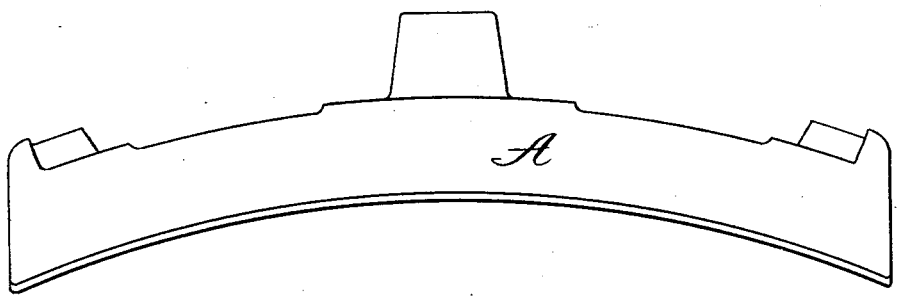
Figure 2:
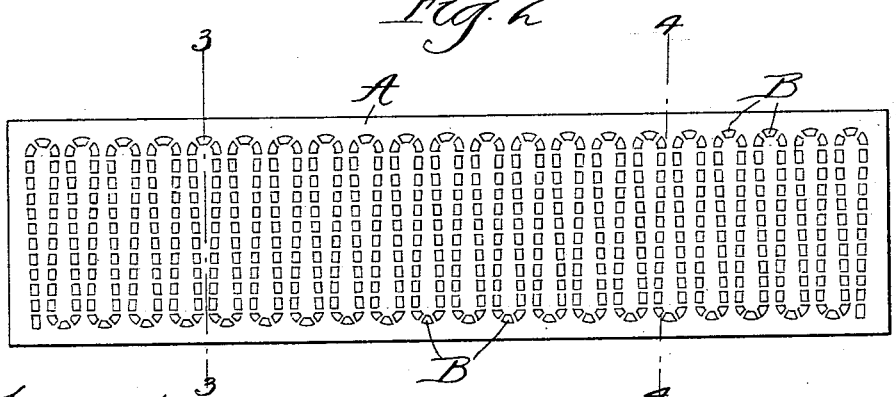
Figure 3:
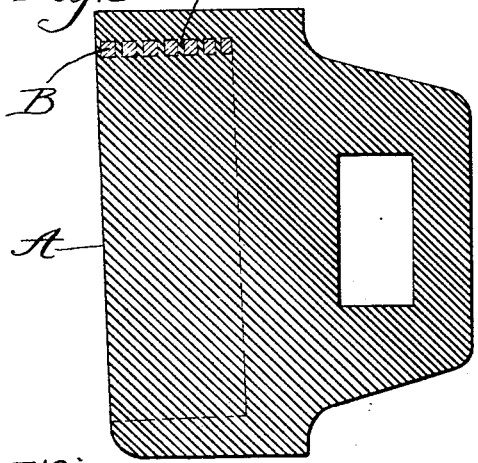
Figure 4:
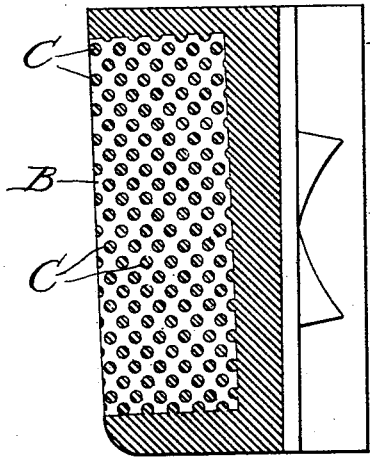

In the accompanying drawings, forming a part of this application, Figure 1 represents a side view of an ordinary brake-shoe. Fig. 2 is a front view of the brake-shoe, showing its wearing-face. Figs. 3 and 4 are sectional views respectively on the lines 3 3 and 4 4 of Fig. 2, showing the arrangement of the reinforcement in the shoe. Fig. 5 is a side view of a brake-shoe which is constructed, designed, and adapted to dress the wheel with which it contacts. Fig. 6 is a front view of a dressing brake-shoe embodying my invention. Fig. 7 is a sectional view on the line 7 7 of Fig. 6. Fig. 8 is a detail perspective view of a portion of the reinforcement, and Fig. 9 is a similar view of a wire reinforcement.

In the drawings like letters of reference denote corresponding parts in all of the figures, referring to which—

A designates the brake-shoe proper, and B the reinforcement. The brake-shoe may be made in any of the numerous different forms in which other kinds of brake-shoes are now being manufactured for different purposes, it being understood that my present invention can be embodied, so far as I am now aware, with all forms of brake-shoes now in use.

The reinforcement consists of a strip of foraminous metal which is flexed and reflexed until it assumes a sinuous form. I have shown in Figs. 2 and 6 the reinforcement bent in different ways, the essential difference between the reinforcement in these figures being simply in the degree of sinuosity, and this is a matter which depends upon different circumstances and the varieties of shoes in which my invention is embodied.

The reinforcement is preferably composed of a single strip bent in the manner heretofore described, so that the reinforcement will be distributed throughout the shoe in such a manner that as the shoe wears in use it will always present a wearing-face of a composite and finely-divided character. The same results may therefore be secured by dividing the reinforcement into two or more parts and arranging them in substantially the manner herein shown and described, and for the same purpose it may be found desirable to provide a reinforcement consisting of a number of pieces which can be arranged transversely in the brake-shoe and which will produce in the combined effect a reinforcement to all intents and purposes the same as a continuous strip-reinforcement, as shown, for example, in Fig. 2.

The character and shape of the reinforcement of course depend primarily upon the kind of shoe with which it is combined, but in each instance the reinforcement is of such a shape and is so disposed that it will be evenly distributed throughout the shoe and in such a manner that the wearing-face of the shoe will always consist of portions of the shoe proper and portions of the reinforcement.

The reinforcement is provided with a number of holes or perforations C, which are preferably made in the regular manner illustrated in the drawings, and when the shoe is made the metal composing the body of the brake-shoe will fill these holes or perforations and therefore hold the reinforcement securely in place in such a manner that the reinforcement and the body of the shoe are practically one solid piece.

In making my improved brake-shoe the reinforcement having been properly shaped is supported in the mold, and then the metal of which the shoe proper is composed is poured into the mold in any of the well-known ways. I prefer to make the shoe proper of a metal having a granular character, such as cast-iron, while the reinforcement is made of a fibrous metal, such as soft steel, these particular metals having been found to produce a shoe of superior frictional and wearing qualities and one which has an unusual length of life. The depth of the reinforcement depends upon the character of the brake-shoe, the essential requirements being only that this reinforcement shall extend entirely through that portion of the shoe which will be worn in actual use.

It is desirable that the wearing-face of the shoe shall be of a composite character—that is to say, comprising parts of the reinforcement and parts of the brake-shoe proper—so that the particles or granules worn or ground from the granular metal shoe proper will be caught and held by the exposed parts of the reinforcement before said particles or granules have moved any considerable distance. The particles which are ground off of the shoe proper will be caught and held by the reinforcement immediately after they begin to move, and in this way the accumulation of these grindings at one place and the resulting injury to the wheel caused thereby are prevented.

In order to insure a wearing-face of a composite character in its best position, the reinforcement is preferably arranged angularly in the brake-shoe, so that the wearing-face of the brake-shoe will at all times comprise in part portions of the reinforcement. As shown in Fig. 4, the reinforcement is located in an angular position in the brake-shoe, so that when the face of the shoe has worn down and through the cast-iron plugs in the holes or perforations at one end of the row the plugs in the holes or perforations about the middle of the row will be partially worn, while those at the opposite end of the row will just have begun to wear. By this arrangement of the reinforcement it will be observed that at no time is there a continuous wearing-face of only one metal, but, on the contrary, the face of the brake-shoe is always composed of the different metals of which the shoe is made. It is obvious that the same results could be accomplished by different arrangements of the reinforcement in the body of the brake-shoe; but I do not consider it necessary to illustrate the many different ways in which this reinforcement could be disposed in the body of the brake-shoe, and it is also obvious that the same results would be secured whenever the rows of perforations in the reinforcement are arranged at an angle to the plane of the wearing-face of the shoe, whether the reinforcement itself is located angularly within the brake-shoe or otherwise.

The reinforcement may be of many different kinds, and in Fig. 8 of the drawings I have shown the same as consisting of a metal strip or tape provided with numerous holes or perforations. In Fig. 9 I have shown another kind of reinforcement which consists of a wire-netting, the holes or interstices therein corresponding to the perforations in the metal strip shown in Fig. 8, and this kind of a reinforcement is particularly useful in practicing my invention by reason of the fact that it can be readily bent or formed into any shape desired.

The reinforcement strengthens the brake-shoe, and for this reason and also because of its peculiar characteristics hereinbefore mentioned it promotes the longevity and frictional quality of the shoe as well as strengthens it. In this manner I am enabled to secure in a brake-shoe the superior frictional and wearing qualities of a cast-iron brake-shoe as well as the enduring qualities of a steel shoe, thereby obtaining a shoe having maximum braking qualities and a long life.

I am aware that changes may be made in the forms and proportions of parts, the arrangement of the reinforcement in the brake-shoe and its peculiar construction, as well as in the particular metals of which the shoe proper and its reinforcement are composed, and I therefore reserve the right to make all such changes as fall within the spirit and scope of the invention.

I do not claim herein, broadly, a brake-shoe provided with a foraminous insert, nor a brake-shoe having a wearing-face of a finely-divided composite character, nor one in which the component metals constantly change in area and disposition during wear, except as herein described and claimed, these forming the subject-matter of another application filed by me on April 14, 1897, bearing Serial No. 632,151.

Having thus fully described my invention, what I claim, and desire to secure by Letters Patent, is—

1. A cast-metal brake-shoe having a foraminous sinuous reinforcement embedded therein, substantially as and for the purpose described.

2. A brake-shoe, having a sinuous reinforcement embedded therein, said reinforcement being provided with a series of rows of perforations arranged at an angle to the plane of the wearing-face of the shoe, substantially as described.

3. A cast-metal brake-shoe having a foraminous sinuous reinforcement composed of a fibrous metal located therein, substantially as described.

4. A cast-iron brake-shoe having a foraminous sinuous fibrous metal reinforcement located angularly therein, substantially as described.

5. A brake-shoe comprising a granular metal shoe proper and a reinforcement embedded therein and consisting of a strip of fibrous metal bent into a sinuous form and provided with holes or perforations, said reinforcement being arranged so that one edge thereof will form a part of the wearing-face of the brake-shoe.

WILLIAM D. SARGENT.

Witnesses:
WM. O. BELT,
F. H. DRURY.